United States Patent
Wu et al.

(10) Patent No.: US 12,004,230 B2
(45) Date of Patent: Jun. 4, 2024

(54) RANDOM ACCESS METHOD AND RELATED DEVICE

(71) Applicant: VIVO MOBILE COMMUNICATION CO., LTD., Chang'an Dongguan (CN)

(72) Inventors: Yumin Wu, Chang'an Dongguan (CN); Yue Ma, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 696 days.

(21) Appl. No.: 17/158,335

(22) Filed: Jan. 26, 2021

(65) Prior Publication Data
US 2021/0153263 A1    May 20, 2021

Related U.S. Application Data

(63) Continuation of application No. PCT/CN2019/097862, filed on Jul. 26, 2019.

(30) Foreign Application Priority Data

Jul. 26, 2018 (CN) .......................... 201810835735.4

(51) Int. Cl.
H04W 74/0833    (2024.01)
H04L 41/0803    (2022.01)
H04W 72/21      (2023.01)

(52) U.S. Cl.
CPC ..... *H04W 74/0841* (2013.01); *H04L 41/0803* (2013.01); *H04W 72/21* (2023.01)

(58) Field of Classification Search
None
See application file for complete search history.

(56) References Cited

U.S. PATENT DOCUMENTS

2013/0265942 A1*  10/2013  Lu .................... H04W 24/02
                                                    370/328
2017/0048889 A1*   2/2017  Kadous .............. H04W 72/23
(Continued)

FOREIGN PATENT DOCUMENTS

CN    106470468 A    8/2013
CN    104852787 A    8/2015
(Continued)

OTHER PUBLICATIONS

European Search Report related to Application No. 19841659.6; reported on Sep. 2, 2021.
(Continued)

*Primary Examiner* — Faiyazkhan Ghafoerkhan
(74) *Attorney, Agent, or Firm* — von Briesen & Roper, s.c.

(57) ABSTRACT

Provided by the present disclosure are a random access method and a related device, the method comprises: sending a first message to a network-side device; receiving a response message sent by the network side device and carrying target configuration information; there is a correlation between at least part of the target configuration information and relevant parameters, and the relevant parameters are parameters that can be learned before a terminal device receives the response message; and obtaining, according to the correlation, configuration information, in the target configuration information, related with a target relevant parameter of the terminal device.

16 Claims, 5 Drawing Sheets

(56) References Cited

U.S. PATENT DOCUMENTS

| | | | |
|---|---|---|---|
| 2017/0231011 A1* | 8/2017 | Park | H04W 72/0446 |
| 2018/0034525 A1* | 2/2018 | Park | H04B 7/0456 |
| 2018/0103465 A1* | 4/2018 | Agiwal | H04W 74/004 |
| 2018/0249508 A1* | 8/2018 | Gao | H04L 27/26132 |
| 2019/0215864 A1* | 7/2019 | Yang | H04W 74/02 |
| 2019/0261255 A1* | 8/2019 | You | H04W 16/14 |
| 2019/0350004 A1* | 11/2019 | Zhao | H04W 76/11 |
| 2020/0404711 A1* | 12/2020 | Zhao | H04W 80/02 |
| 2021/0045163 A1* | 2/2021 | Chai | H04W 76/11 |
| 2021/0153263 A1* | 5/2021 | Wu | H04W 74/0841 |
| 2021/0274550 A1* | 9/2021 | Zhang | H04W 80/02 |

FOREIGN PATENT DOCUMENTS

| | | |
|---|---|---|
| CN | 107360628 A | 11/2017 |
| CN | 107371273 A | 11/2017 |
| CN | 107466113 A | 12/2017 |
| CN | 108024310 A | 5/2018 |
| CN | 108289339 A | 7/2018 |
| KR | 20130093656 A | 8/2013 |
| WO | 2018085726 A1 | 5/2018 |
| WO | WO-2018085726 A1 * | 5/2018 |

OTHER PUBLICATIONS

International Search Report & Written Opinion related to Application No. PCT/CN2019/097862; reported on Feb. 4, 2021.
First Chinese Office Action for related Application No. 201810835735.4; reported on Dec. 30, 2020.
Singapore First Office Action related to Application No. 11202100831Y reported on Oct. 7, 2022.
Korean Office Action related to Application No. 10-2021-7005085 reported on Feb. 19, 2021.

* cited by examiner

RANDOM ACCESS METHOD AND RELATED DEVICE

CROSS REFERENCE

This application is a continuation application of PCT Application No. PCT/CN2019/097862 filed on Jul. 26, 2019, which claims priority to Chinese Patent Application No. 201810835735.4 filed in China on Jul. 26, 2018, which is incorporated herein by reference in its entirety.

TECHNICAL FIELD

The present disclosure relates to the field of communications technologies, and in particular, to a random access method and a related device.

BACKGROUND

In a random access procedure, a network side device may receive random access messages (such as Msg1 or Msg3) transmitted by multiple terminal devices and can feedback response messages (such as Msg2 or Msg4) to multiple terminal devices, where the response message may contain configuration information such as a timing advance, a back-off parameter, and an uplink transmission resource. However, in the case where the network side device feeds back the response messages to multiple terminal devices, multiple terminal devices would perform subsequent random access steps based on the configuration information in the response messages. Consequently, there is likely a collision amongst these multiple terminal devices.

SUMMARY

Embodiments of the present disclosure provide a random access method and a related device, to reduce the probability of collision amongst multiple terminal devices in a random access process.

To resolve the foregoing technical problem, the present disclosure is implemented as follows:

According to a first aspect, an embodiment of the present disclosure further provides a random access method. The method includes:

transmitting a first message to a network side device;

receiving a response message that is transmitted by the network side device and that includes target configuration information, where, there is an association relationship between at least some configuration information in the target configuration information and an association parameter, and the association parameter is a parameter that can be obtained by the terminal device before the terminal device receives the response message; and obtaining, based on the association relationship, configuration information that is associated with a target association parameter of the terminal device from the target configuration information.

According to a second aspect, an embodiment of the present disclosure further provides a random access method. The method includes:

receiving a first message transmitted by a terminal device; and transmitting, to the terminal device, a response message that includes target configuration information; where there is an association relationship between at least some configuration information in the target configuration information and an association parameter, and the association parameter is a parameter that can be obtained by the terminal device before the terminal device receives the response message.

According to a third aspect, an embodiment of the present disclosure further provides a terminal device. The terminal device includes:

a first transmission module, configured to transmit a first message to a network side device;

a first receiving module, configured to receive a response message that is transmitted by the network side device and that includes target configuration information, where there is an association relationship between at least some configuration information in the target configuration information and an association parameter, and the association parameter is a parameter that can be obtained by the terminal device before the terminal device receives the response message; and an obtaining module, configured to obtain, based on the association relationship, configuration information that is associated with a target association parameter of the terminal device from the target configuration information.

According to a fourth aspect, an embodiment of the present disclosure further provides a network side device. The network side device includes:

a first receiving module, configured to receive a first message transmitted by a terminal device; and a first transmission module, configured to transmit, to the terminal device, a response message that includes target configuration information, where, there is an association relationship between at least some configuration information in the target configuration information and an association parameter, and the association parameter is a parameter that can be obtained by the terminal device before the terminal device receives the response message.

According to a fifth aspect, an embodiment of the present disclosure further provides a terminal device, including a memory, a processor, and a computer program that is stored in the memory and that can run on the processor, where when the computer program is executed by the processor, steps of the random access method provided in the first aspect are implemented.

According to a sixth aspect, an embodiment of the present disclosure further provides a network side device, including a memory, a processor, and a computer program that is stored in the memory and that can run on the processor, where when the computer program is executed by the processor, steps of the random access method provided in the second aspect are implemented.

According to a seventh aspect, an embodiment of the present disclosure further provides a computer-readable storage medium, where the computer-readable storage medium stores a computer program, and when the computer program is executed by a processor, steps of the random access method provided in the first aspect are implemented, or steps of the random access method provided in the second aspect are implemented.

In the embodiments of the present disclosure, a first message is sent to a network side device, a response message that is transmitted by the network side device and that includes target configuration information is received, where, there is an association relationship between at least some configuration information in the target configuration information and an association parameter, and the association parameter is a parameter that can be obtained by the terminal device before the terminal device receives the response message; and configuration information that is associated with a target association parameter of the terminal device is obtained from the target configuration information based on the association relationship. Therefore, each terminal device may obtain, based on the association parameter, configuration information corresponding to the terminal device, to reduce the probability of collision amongst multiple terminal devices in a random access process.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first,", "second", etc. in the Description and Claims of the present application are used to distinguish similar objects, instead of describing a specific sequence or order. It should be understood that data used in this way may be interchangeable in appropriate cases, so that the embodiments of this application described herein are implemented in a sequence other than those shown or described herein. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in the specification and claims, "and/or" is used to indicate at least one of connected objects, for example, A and/or B and/or C indicates seven cases: only A, only B, only C, both A and B, both B and C, both A and C, and A, B and C.

For ease of understanding, two-step random access is described below.

Figure 1:
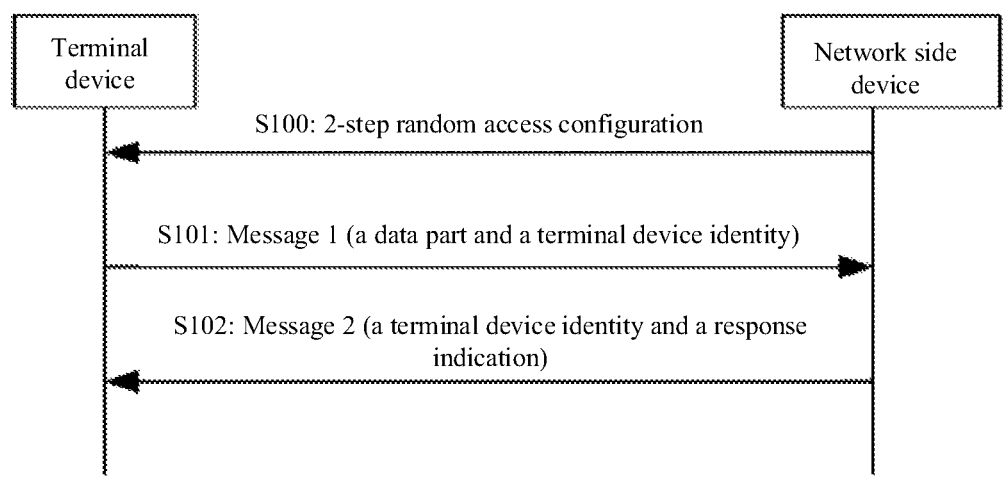
FIG. 1 is a flowchart of a 2-step random access method according to an embodiment of the present disclosure.

For example, as shown FIG. 1, a two-step random access process may include the following steps.

Step S100: A network side device configures configuration information of two-step random access for a terminal device.

In this step, the configuration information may include resource information for Msg1 transmission and resource information for Msg2 reception.

Step S101: The terminal device transmits Msg1 to the network side device.

In this step, the terminal device initiates a two-step random access (2-Step RACH) procedure, and transmits Msg1 to the network side device. Msg1 may include a data payload part (for example, a radio resource control message) and a control part (for example, a terminal device identity (for example, a random access preamble identifier)), or may include only a data part.

Step S102: The network side device transmits Msg2 to the terminal device.

In this step, Msg2 may carry a terminal device identity (UE ID) and a response indication (ACK Indication).

Figure 2:
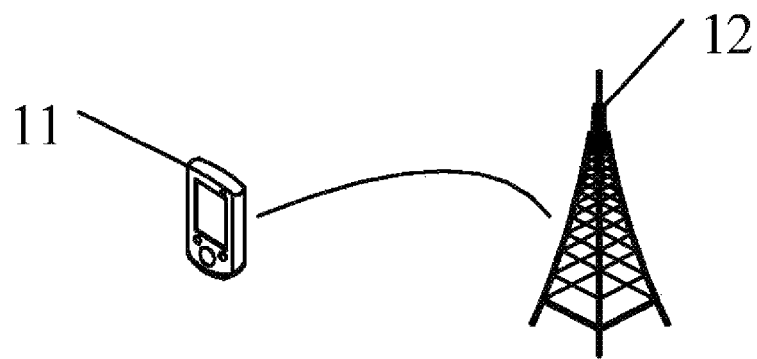
FIG. 2 is a schematic diagram of a network structure to which an embodiment of the present disclosure is applicable.

FIG. 2 is a schematic diagram of a network structure to which an embodiment of the present disclosure is applicable. As shown in FIG. 2, the network structure includes a terminal device 11 and a network side device 12. The terminal device 11 may be a terminal device side device such as a mobile phone, a tablet personal computer (Tablet Personal Computer), a laptop computer (Laptop Computer), a personal digital assistant (Personal Digital Assistant, PDA), a mobile Internet device (Mobile Internet Device, MID), or a wearable device (Wearable Device). It should be noted that a specific type of the terminal device 11 is not limited in this embodiment of the present disclosure. The network side device 12 may be a base station, for example, a macro base station, an LTE eNB, a 5G NR NB, or a gNB. The network side device 12 may alternatively be a small cell, such as a low power node (Low Power Node, LPN) pico or a femto, or the network side device 12 may be an access point (Access Point, AP). The base station may also be a network node including a central unit (Central Unit, CU) and multiple transmission reception points (Transmission Reception Point, TRP) managed and controlled by the central unit. It should be noted that a specific type of the network side device 12 is not limited in this embodiment of the present disclosure.

In this embodiment of the present disclosure, the terminal device 11 may transmit a first message to the network side device 12, where the first message may be different messages in different access processes, such as Msg1 or Msg3 in a contention random access process, or Msg1 in the two-step random access process. The contention random access process is as follows: The terminal device transmits a random access request message Msg1 by using an uplink control channel (for example, a PRACH), a network side transmits a random access response message Msg2 based on content of Msg1 by using a downlink data channel (for example, a PDSCH), the terminal device transmits an identification message Msg3 of the terminal device by using an uplink data channel (for example, a PUSCH) based on an uplink resource indicated in Msg2, and the network side transmits a contention resolution identification message Msg4 based on content of Msg3 by using a downlink data channel (for example, a PDSCH). The network side device 12 transmits, in response to the received first message, a response message corresponding to the first message to the terminal device 11. For example, when the first message is Msg1 in the contention random access process, the response message may be Msg2 in the contention random access process; when the first message is Msg3 in the contention random access process, the response message may be Msg4 in the contention random access process; and when the first message is Msg1 in the two-step random access process, the response message may be Msg2 in the two-step random access process.

The response message may carry target configuration information, and there is an association relationship between at least some configuration information in the target configuration information and an association parameter, where the association parameter is a parameter that can be obtained by the terminal device before the terminal device receives the response message.

For example, the response message is Msg2. The target configuration information may include at least one of the following: a random access preamble identifier, a timing advance, uplink resource allocation information used to indicate a transmission resource for a feedback message of Msg2, a terminal device identity, a contention resolution identity, and wireless connection configuration information.

It should be noted that the target configuration information may include multiple pieces of configuration information used by multiple terminal devices. For example, the target configuration information may include at least one of the following: multiple preamble identities, multiple timing advances, multiple pieces of uplink resource allocation information used to indicate a transmission resource for a feedback message of Msg2, multiple terminal device identities, multiple contention resolution identities, and multiple pieces of wireless connection configuration information.

The association parameter may be a parameter that can be obtained by the terminal device before the terminal device receives the response message, for example, a random access preamble identifier or a contention resolution identity, so that the terminal device 11 may obtain, based on the association relationship, configuration information that is associated with the target association parameter of the terminal device 11 from the target configuration information. For example, the uplink resource allocation information is associated with the contention resolution identity. After determining contention resolution for a specific contention resolution identity, the terminal device 11 may use uplink resource allocation information associated with the contention resolution identity to transmit feedback information of Msg2.

Specific descriptions are provided below with reference to examples.

It is assumed that five terminal devices, namely, a terminal device A1 to a terminal device A5, transmit the first message to the network side device. After receiving the first message, the network side device generates the response message. Uplink resource allocation information, namely, uplink resource allocation information B1 to uplink resource allocation information B5, may be separately configured for the five terminal devices in the response message, and the uplink resource allocation information B1 to the uplink resource allocation information B5 are respectively associated with an association parameter X1 to an association parameter X5.

After receiving the response message, the terminal device A1 to the terminal device A5 recognize the association parameters, and may use transmission resources indicated by uplink resource allocation information associated with the association parameters. Specifically, if the terminal device A1 identifies that the association parameter X1 is the association parameter of the terminal device A1, a transmission resource indicated by uplink resource allocation information B1 associated with the association parameter X1 may be used; if the terminal device A2 identifies that the association parameter X2 is the association parameter of the terminal device A2, a transmission resource indicated by uplink resource allocation information B2 associated with the association parameter X2 may be used; if the terminal device A3 identifies that the association parameter X3 is the association parameter of the terminal device A3, a transmission resource indicated by uplink resource allocation information B3 associated with the association parameter X3 may be used; if the terminal device A4 identifies that the association parameter X4 is the association parameter of the terminal device A4, a transmission resource indicated by uplink resource allocation information B4 associated with the association parameter X4 may be used; and if the terminal device A5 identifies that the association parameter X5 is the association parameter of the terminal device A5, a transmission resource indicated by uplink resource allocation information B5 associated with the association parameter X5 may be used.

Optionally, the network side device 12 may transmit, to the terminal device 11 in a hybrid automatic repeat request (Hybrid Automatic Repeat Request, HARQ) manner, Msg2 that includes the target configuration information, and HARQ configuration information (for example, a HARQ process identifier and/or a HARQ redundancy version identifier) may be configured by the network side or predefined in a protocol.

Optionally, after receiving Msg2 that is transmitted by the network side device and that includes the target configuration information, the terminal device 11 may transmit a feedback message of Msg2 to the network side device 12.

The feedback message may include at least one of a feedback message from control channel and a feedback message from data channel. The feedback message from data channel includes at least one of a terminal device identity and a cell radio network temporary identifier (Cell radio network temporary identifier, C-RNTI) of a physical uplink shared channel (Physical Uplink Shared Channel, PUSCH).

In an implementation, when determining that the contention resolution succeeds, the terminal device 11 may transmit a feedback message of Msg2 to the network side device 12, to notify the network side device 12 that the contention resolution succeeds.

In another implementation, when successfully receiving Msg2, the terminal device 11 may transmit a feedback message of Msg2 to the network side device 12, notifying the network side device 12 that the Msg2 has been successfully received, so that the network side device 12 may stop retransmission of Msg2.

Optionally, the terminal device 11 may also transmit the feedback message of Msg2 to the network side device 12 in a HARQ manner.

Optionally, after receiving the feedback message, the network side device 12 may transmit indication information to the terminal device 11, where the indication information is used to indicate whether the terminal device retransmits the feedback message. For example, when the indication information is a first indication message, the terminal device is instructed to retransmit the feedback message, and when the indication information is a second indication message, the terminal device is instructed not to retransmit the feedback message.

According to the random access method provided in this embodiment of the present disclosure, because there is an association relationship between at least some configuration information in the target configuration information and an association parameter, the terminal device may obtain, from the target configuration information based on the association relationship, configuration information associated with the association parameter of the terminal device, thereby reducing the probability of collision amongst multiple terminal devices in the random access process. In addition, information may be configured for the multiple terminal devices by using a same response message, thereby improving information configuration efficiency and saving system resources.

Figure 3:
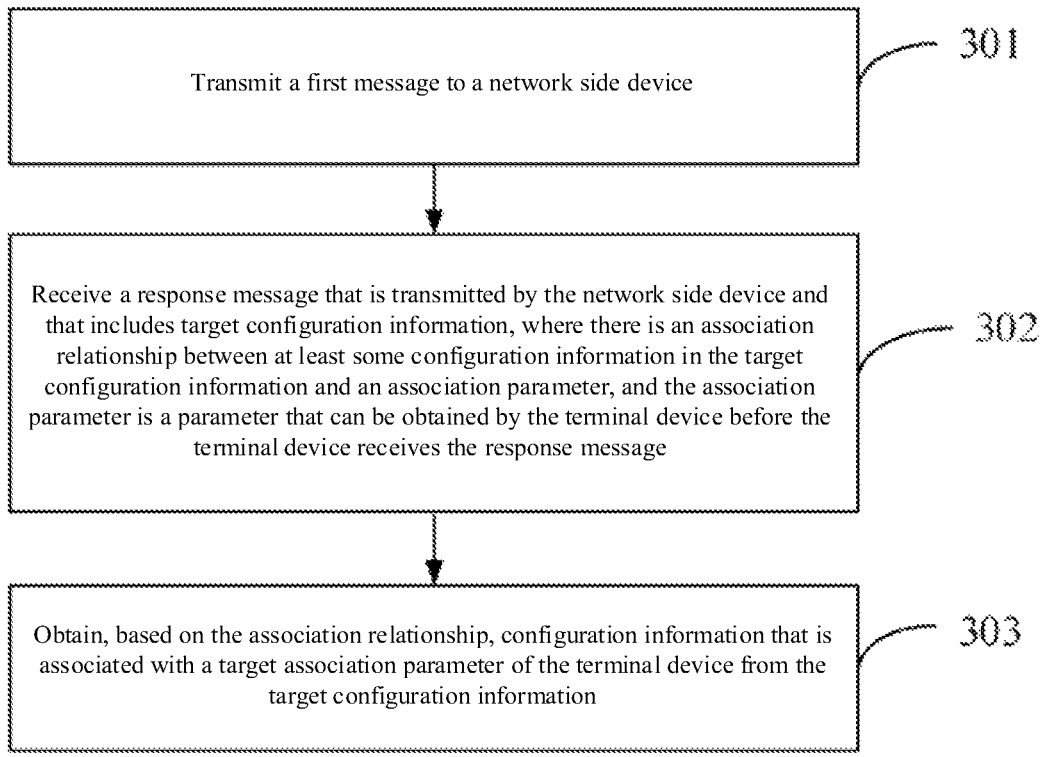
FIG. 3 is a flowchart of a random access method according to an embodiment of the present disclosure.

An embodiment of the present disclosure provides a random access method, which is applied to a terminal device. FIG. 3 is a flowchart of a random access method according to an embodiment of the present disclosure. As shown in FIG. 3, the method includes the following steps:

Step 301: Transmit a first message to a network side device.

In this embodiment of the present disclosure, the first message may be different messages in different access processes, for example, Msg1 or Msg3 in a random access process, or Msg1 in a two-step random access process.

Step 302: Receive a response message that is transmitted by the network side device and that includes target configuration information, where there is an association relationship between at least some configuration information in the target configuration information and an association parameter, and the association parameter is a parameter that can be obtained by the terminal device before the terminal device receives the response message.

In this embodiment of the present disclosure, the response message is a response message corresponding to the first message. For example, when the first message is Msg1 in the contention random access process, the response message may be Msg2 in the contention random access process; when the first message is Msg3 in the contention random access process, the response message may be Msg4 in the contention random access process; and when the first message is Msg1 in the two-step random access process, the response message may be Msg2 in the two-step random access process.

The target configuration information may include but is not limited to at least one of the following: a random access preamble identifier, a timing advance, uplink resource allocation information used to indicate a transmission resource for a feedback message of Msg2, a terminal device identity, a contention resolution identity, and wireless connection configuration information.

It should be noted that the target configuration information may include multiple pieces of configuration information. For example, the target configuration information may include at least one of the following: multiple preamble identities, multiple timing advances, multiple pieces of uplink resource allocation information used to indicate a transmission resource for a feedback message of Msg2, multiple terminal device identities, multiple contention resolution identities, and multiple pieces of wireless connection configuration information.

The association parameter may be a parameter that can be obtained by the terminal device before the terminal device receives the response message, for example, a random access preamble identifier or a contention resolution identity.

Step 303: Obtain, based on the association relationship, configuration information that is associated with a target association parameter of the terminal device from the target configuration information.

In this embodiment of the present disclosure, the terminal device may obtain, from the target configuration information based on the association relationship, the configuration information associated with the target association parameter of the terminal device. For example, if there is an association relationship between the uplink resource allocation information and the preamble identifier, the terminal device may identify, from the response message, a random access preamble identifier transmitted by the terminal device, and therefore can obtain uplink resource allocation information associated with the preamble identifier transmitted by the terminal device.

According to the random access method provided in this embodiment of the present disclosure, because there is an association relationship between at least some configuration information in the target configuration information and an association parameter, the terminal device may obtain, from the target configuration information based on the association relationship, configuration information associated with the association parameter of the terminal device, thereby reducing the probability of collision amongst multiple terminal devices in the random access process.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

In this embodiment of the present disclosure, the preamble identifier (Preamble ID) may also be referred to as a random access preamble identifier. The timing advance is TA (Timing Advance).

The uplink resource allocation information may include indication information of an uplink grant (UL grant), a HARQ feedback resource, a physical uplink control channel (Physical Uplink Control Channel, PUCCH) resource, or the like.

Optionally, the uplink resource allocation information includes at least one of the following:

uplink resource allocation information of a data channel; and uplink resource allocation information of a control channel.

In this implementation, the uplink resource allocation information of the data channel may include an uplink grant (UL grant) of a PUSCH, and the uplink resource allocation information of the control channel may include indication information of a HARQ feedback resource or indication information of the PUCCH resource.

Optionally, if the network side device pre-configures resource configuration information (for example, configured in step S100) used for Msg2 feedback information, the uplink resource allocation information may be indication information of some or all resources in the resource configuration information used for the Msg2 feedback information. For example, if the network side device preconfigures a subframe 0/2/4/6/8 for PUCCH transmission, the uplink resource allocation information may further indicate that the subframe 0 is used for PUCCH transmission.

The terminal device identity (UE identity) may be a C-RNTI. The contention resolution identity (also UE Contention Resolution ID) is used for contention resolution. In this embodiment of the present disclosure, signaling overheads can be reduced by adding the contention resolution identity to Msg2.

The wireless connection configuration information may be a radio resource control setup message (RRCSetup message). It should be noted that the target configuration information may include multiple pieces of configuration information. For example, the target configuration information may include at least one of the following: multiple preamble identities, multiple timing advances, multiple pieces of uplink resource allocation information used to indicate a transmission resource for a feedback message of Msg2, multiple terminal device identities, multiple contention resolution identities, and multiple pieces of wireless connection configuration information.

It may be understood that, Msg2 can carry the preamble identifier only when the terminal device transmits the preamble (Preamble) identifier in Msg1.

Optionally, the association parameter includes at least one of a random access preamble identifier and a contention resolution identity.

In this embodiment of the present disclosure, both the preamble identifier and the contention resolution identity may be parameters that can be obtained by the terminal device before the terminal device receives the response message. In actual application, a random access preamble identifier included in Msg2 is usually a random access preamble identifier carried in Msg1 transmitted by the terminal device, and a contention resolution identity included in Msg2 may be a contention resolution identity obtained based on a code stream in Msg1. Therefore, the terminal device may obtain the preamble identifier and the contention resolution identity before receiving the response message.

In this embodiment of the present disclosure, the timing advance may be associated with the preamble identifier, the contention resolution identity may be associated with the preamble identifier, the uplink resource allocation information may be associated with the contention resolution identity or the preamble identifier, the terminal device identity may be associated with the contention resolution identity or the preamble identifier, and the wireless connection configuration information may be associated with the contention resolution identity or the preamble identifier.

It should be noted that the contention resolution identity is usually unique. In this embodiment of the present disclosure, the contention resolution identity is associated with at least some configuration information in the target configuration information, thereby further reducing the probability of collision amongst terminal devices.

It should be noted that the foregoing association manners may be combined at random according to an actual requirement. This is not limited in this embodiment of the present disclosure.

Optionally, after the receiving Msg2 that is transmitted by the network side device and that includes the target configuration information, the method further includes:

transmitting a feedback message of Msg2 to the network side device.

In this embodiment of the present disclosure, after receiving Msg2 that is transmitted by the network side device and that includes the target configuration information, the terminal device may transmit the feedback message of Msg2 to the network side device, to indicate whether the terminal device successfully decrypts data of Msg2, whether contention resolution succeeds, and the like.

Optionally, the feedback message may include at least one of a feedback message from control channel and a feedback message from data channel.

In this embodiment of the present disclosure, if the network side device is configured to perform feedback by using a control channel, the terminal device feeds back the feedback message from control channel, for example, HARQ ACK information; and if the network side device is configured to perform feedback by using a data channel, the terminal device feeds back data channel feedback information, for example, control information carried in a PUSCH. Optionally, a feedback message that needs to be fed back by the terminal device may be predefined in the protocol.

Optionally, the feedback message from data channel includes at least one of a terminal device identity and a cell radio network temporary identifier C-RNTI of a physical uplink shared channel PUSCH.

In this embodiment of the present disclosure, the terminal identity of the PUSCH may be C-RNTI scrambling code in the PUSCH. It should be noted that if the C-RNTI is sent in a media access control (Media Access Control, MAC) control element (Control Element, CE) or a radio resource control (Radio Resource Control, RRC) message, the data channel feedback information may include the C-RNTI.

Optionally, the transmitting a feedback message of Msg2 to the network side device includes:

when the terminal device considers that contention resolution is successful, it transmits the feedback message of Msg2 to the network side device; or when successfully receiving the Msg2, the terminal device transmits the feedback message of Msg2 to the network side device.

In an implementation, when determining that the contention resolution succeeds, the terminal device may transmit the feedback message of Msg2 to the network side device, to notify the network side device that the contention resolution succeeds.

In another implementation, when successfully receiving Msg2, the terminal device may transmit the feedback message of Msg2 to the network side device, to notify the network side device that the terminal device has successfully received Msg2. For example, when data of Msg2 is successfully decoded, the terminal device may perform feedback to the network side device, to instruct the network side device to stop retransmitting Msg2, thereby saving system resources.

Optionally, the transmitting a feedback message of Msg2 to the network side device includes:

transmitting the feedback message of Msg2 to the network side device in a HARQ manner.

In this embodiment of the present disclosure, the feedback message of Msg2 may be sent to the network side device in the HARQ manner, to improve a success rate of transmitting the feedback message. For example, if the terminal device performs feedback by using the data channel (for example, the PUSCH), data of the data channel may be transmitted by using a HARQ process.

It should be noted that HARQ configuration information may be configured by a network side (for example, indicated by DCI or configured by using RRC) or predefined in the protocol. The HARQ configuration information may include at least one of the following: a HARQ process identifier and a HARQ redundancy version identifier.

The HARQ process identifier is used to uniquely identify the HARQ process. Specifically, the HARQ process identifier may be a HARQ process identifier independent of another uplink data transmitting, or may be a HARQ process identifier shared with another uplink data transmitting. In this case, the HARQ process identifier may be indicated by using an uplink grant (UL Grant) in Msg2.

The HARQ redundancy version identifier may be a redundancy version identifier predefined in the protocol, for example, RV0, or may be a HARQ redundancy version identifier indicated by the network side device by using the uplink grant (UL Grant) in Msg2.

Optionally, after the transmitting a feedback message of Msg2 to the network side device, the method further includes:

when first indication information transmitted by the network side device is received, retransmitting the feedback message of Msg2 to the network side device, where the first indication information is used to instruct to retransmit the feedback message.

In this embodiment of the present disclosure, when receiving the first indication information that is transmitted by the network device and that is used to instruct to retransmit the feedback message, the terminal device may retransmit the feedback message of Msg2 to the network side device. In this embodiment of the present disclosure, the network side device instructs the terminal device to retransmit the feedback message, so that transmission flexibility of the feedback message can be improved, and system resources can be saved while the success rate of transmitting the feedback message is improved.

Optionally, when the feedback message is a feedback message from data channel, the method further includes:

starting a timer at the moment when the feedback message is transmitted to the network side device;

if the timer is running, stopping the timer if the second indication information transmitted by the network side device is received, where the second indication information is used to indicate that the retransmitting the feedback message is not needed; and retransmitting the feedback message to the network side device if the timer expires.

In this embodiment of the present disclosure, the timer may be an uplink grant timer (UL Grant Timer). Specifically, the timer is set to control retransmission of the feedback message. When the timer expires, it is determined that the network side device does not receive the feedback message, the feedback message is retransmitted to the network side device, and when the second indication information is received, the timer is stopped.

Optionally, a maximum quantity of retransmission times of retransmitting the feedback message to the network side device may be predefined in the protocol, or may be configured by the network side. For example, the maximum quantity of retransmission times configured by the network side is 3.

In this embodiment of the present disclosure, the timer is set to control retransmission of the feedback message, so that implementation is relatively simple and convenient.

Optionally, when the feedback message is a feedback message from data channel, the method further includes:

starting a timer at the moment when the feedback message is transmitted to the network side device;

if the timer is running, restarting the timer and retransmitting the feedback message to the network side device if first indication information transmitted by the network side device is received, where the first indication information is used to instruct to retransmit the feedback message; and stopping retransmitting the feedback message to the network side device if the timer expires.

In this embodiment of the present disclosure, the timer may also be an uplink grant timer (UL Grant Timer). Specifically, when the timer does not expire, if the first indication information is received, the feedback message is retransmitted to the network side device, and the timer is restarted. If the timer expires, it is determined that the network side device receives the feedback information.

In this embodiment of the present disclosure, the timer is set to control retransmission of the feedback message, so that implementation is relatively simple and convenient.

Optionally, in this embodiment of the present disclosure, when the terminal device performs feedback by using the data channel (for example, the PUSCH), retransmission of the feedback message may be controlled by using the timer.

Figure 4:
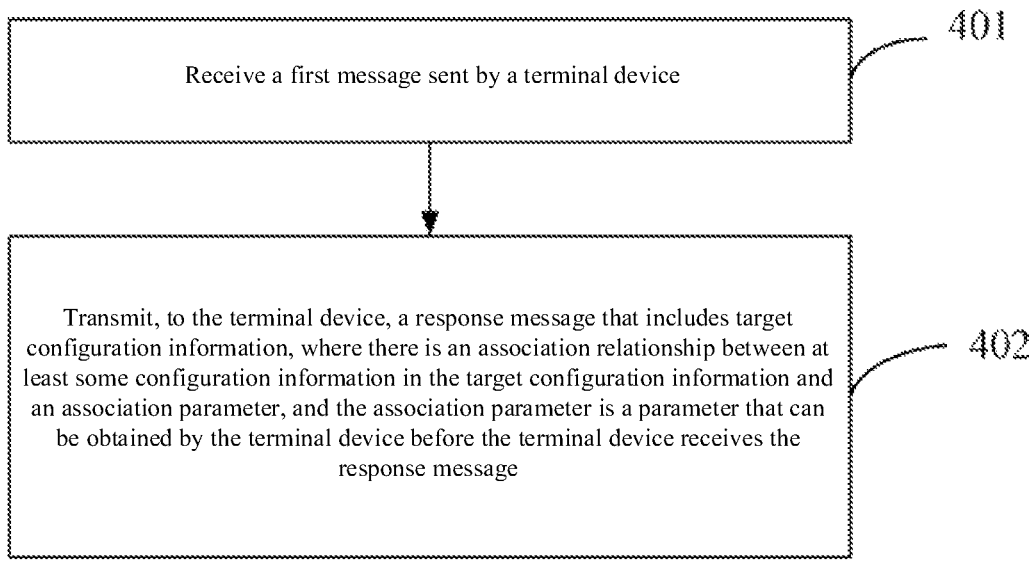
FIG. 4 is a flowchart of another random access method according to an embodiment of the present disclosure.

An embodiment of the present disclosure further provides a random access method, which is applied to a network side device. FIG. 4 is a flowchart of another random access method according to an embodiment of the present disclosure. As shown in FIG. 4, the method includes the following steps:

Step 401: Receive a first message transmitted by a terminal device.

In this embodiment of the present disclosure, the first message may be different messages in different access processes, for example, Msg1 or Msg3 in a random access process, or Msg1 in a two-step random access process.

Step 402: Transmit, to the terminal device, a response message that includes target configuration information, where there is an association relationship between at least some configuration information in the target configuration information and an association parameter, and the association parameter is a parameter that can be obtained by the terminal device before the terminal device receives the response message.

In this embodiment of the present disclosure, the response message is a response message corresponding to the first message. For example, when the first message is Msg1 in the contention random access process, the response message may be Msg2 in the contention random access process; when the first message is Msg3 in the contention random access process, the response message may be Msg4 in the contention random access process; and when the first message is Msg1 in the two-step random access process, the response message may be Msg2 in the two-step random access process.

The target configuration information may include but is not limited to at least one of the following: a random access preamble identifier, a timing advance, uplink resource allocation information used to indicate a transmission resource for a feedback message of Msg2, a terminal device identity, a contention resolution identity, and wireless connection configuration information.

It should be noted that the target configuration information may include multiple pieces of configuration information. For example, the target configuration information may include at least one of the following: multiple preamble identities, multiple timing advances, multiple pieces of uplink resource allocation information used to indicate a transmission resource for a feedback message of Msg2, multiple terminal device identities, multiple contention resolution identities, and multiple pieces of wireless connection configuration information.

The association parameter may be a parameter that can be obtained by the terminal device before the terminal device receives the response message, for example, a random access preamble identifier or a contention resolution identity, so that the terminal device may obtain, based on the association relationship, configuration information that is in the target configuration information and that is associated with the target association parameter of the terminal device. For example, the uplink resource allocation information is associated with the contention resolution identity. After determining contention resolution for a specific contention resolution identity, the terminal device may use uplink resource allocation information associated with the contention resolution identity to transmit feedback information of Msg2.

According to the random access method provided in this embodiment of the present disclosure, the first message transmitted by the terminal device is received, and the response message that includes the target configuration information is sent to the terminal device, where there is an association relationship between at least some configuration information in the target configuration information and an association parameter, and the association parameter is a parameter that can be obtained by the terminal device before the terminal device receives the response message, so that each terminal device can obtain, based on the association parameter, configuration information corresponding to the terminal device, thereby reducing the probability of collision amongst multiple terminal devices in the random access process.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

In this embodiment of the present disclosure, the preamble identifier (Preamble ID) may also be referred to as a random access preamble identifier. The timing advance is TA (Timing Advance).

The uplink resource allocation information may include indication information of an uplink grant (UL grant), a HARQ feedback resource, a PUCCH resource, or the like.

Optionally, the uplink resource allocation information includes at least one of the following:

uplink resource allocation information of a data channel; and uplink resource allocation information of a control channel.

In this implementation, the uplink resource allocation information of the data channel may include an uplink grant of a PUSCH, and the uplink resource allocation information of the control channel may include indication information of a HARQ feedback resource or indication information of the PUCCH resource.

Optionally, if the network side device pre-configures resource configuration information (for example, configured in step S100) used for Msg2 feedback information, the uplink resource allocation information may be indication information of some or all resources in the resource configuration information used for the Msg2 feedback information. For example, if the network side device preconfigures a subframe 0/2/4/6/8 for PUCCH transmission, the uplink resource allocation information may further indicate that the subframe 0 is used for PUCCH transmission.

The terminal device identity (UE identity) may be a C-RNTI. The contention resolution identity (UE Contention Resolution ID) is used for contention resolution. In this embodiment of the present disclosure, signaling overheads can be reduced by adding the contention resolution identity to Msg2.

The wireless connection configuration information may be a radio resource control setup message (RRCSetup message).

It should be noted that the target configuration information may include multiple pieces of configuration information. For example, the target configuration information may include at least one of the following: multiple preamble identities, multiple timing advances, multiple pieces of uplink resource allocation information used to indicate a transmission resource for a feedback message of Msg2, multiple terminal device identities, multiple contention resolution identities, and multiple pieces of wireless connection configuration information.

It may be understood that, Msg2 can carry the preamble identifier only when the terminal device transmits the preamble (Preamble) identifier in Msg1.

Optionally, the association parameter may include at least one of a random access preamble identifier and a contention resolution identity.

In this embodiment of the present disclosure, both the preamble identifier and the contention resolution identity may be parameters that can be obtained by the terminal device before the terminal device receives the response message. In actual application, a random access preamble identifier included in Msg2 is usually a random access preamble identifier carried in Msg1 transmitted by the terminal device, and a contention resolution identity included in Msg2 may be a contention resolution identity obtained based on a code stream in Msg1. Therefore, the terminal device may obtain the preamble identifier and the contention resolution identity before receiving the response message.

The association relationship between at least some configuration information in the target configuration information and the association parameter is described below by using examples.

1. Association Manner of the Timing Advance

The timing advance is associated with the preamble identifier.

In this implementation, the terminal device may identify, from the random access preamble identifier included in Msg2, a random access preamble identifier which is the index of random access preamble transmitted by the terminal device in Msg1, and determine a timing advance associated with the identifier of random access preamble transmitted by the terminal device in Msg1, as calculated by using a random access signal (such as a physical random access channel (Physical Random Access Channel, PRACH)) of Msg1 corresponding to the random access preamble identifier, and may use the timing advance to transmit a subsequent signal after Msg1, for example, to retransmit data (such as, a PUSCH) of Msg1, to transmit feedback information of Msg2 corresponding to Msg1, and to transmit data obtained after the terminal device transits into the connected state.

2. Association Manner of the Contention Resolution Identity

The contention resolution identity is associated with the preamble identifier.

In this implementation, the terminal device may identify, from a random access preamble identifier included in Msg2, a random access preamble identifier transmitted by the terminal device in Msg1, and use, for contention resolution, a contention resolution identity associated with the preamble identifier transmitted by the terminal device in Msg1.

Optionally, one preamble identifier may be associated with multiple contention resolution identities, and the terminal device may use, for contention resolution, all contention resolution identities associated with the preamble identifier transmitted by the terminal device.

It should be noted that, when the contention resolution identity is not associated with any preamble identifier, the terminal device may use, for contention resolution, one or more contention resolution identities received by the terminal device.

3. Association Manner of the Uplink Resource Allocation Information

The uplink resource allocation information is associated with the contention resolution identity.

In this implementation, after determining contention resolution for a contention resolution identity, the terminal device uses uplink resource allocation information associated with the contention resolution identity to transmit the feedback information of Msg2.

The uplink resource allocation information is associated with the preamble identifier.

In this implementation, the terminal device may identify, from a random access preamble identifier included in Msg2, a random access preamble identifier transmitted by the terminal device in Msg1, and use uplink resource allocation information associated with the preamble identifier transmitted by the terminal device in Msg1 to transmit the feedback information of Msg2.

4. Association Manner of the Terminal Device Identity

The terminal device identity is associated with the contention resolution identity.

In this implementation, after determining contention resolution for a contention resolution identity, the terminal device uses, as an identifier of UE in a connected state, a terminal device identity (UE identity) associated with the contention resolution identity.

The terminal device identity is associated with the preamble identifier.

In this implementation, the terminal device may identify, from a random access preamble identifier included in Msg2, a random access preamble identifier transmitted by the terminal device in Msg1, and use, as an identifier of a terminal device in a connected state, a terminal device identity (UE identity) associated with the preamble identifier transmitted by the terminal device in Msg1.

5. Association manner of the Wireless Connection Configuration Information

The wireless connection configuration information is associated with the contention resolution identity.

In this implementation, after determining contention resolution for a contention resolution identity, the terminal device uses, as wireless connection configuration information of a terminal device in a connected state, wireless connection configuration information associated with the contention resolution identity.

The wireless connection configuration information is associated with the preamble identifier.

In this implementation, the terminal device may identify, from a random access preamble identifier included in Msg2, a random access preamble identifier transmitted by the terminal device in Msg1, and use, as wireless connection configuration information of a terminal device in a connected state, wireless connection configuration information associated with the preamble identifier transmitted by the terminal device in Msg1.

Optionally, for the terminal device in a connected state, when a terminal device identity in Msg2 received by the terminal device matches the identifier of the terminal device in the connected state, the terminal device considers that contention resolution of this random access process succeeds. In actual application, a C-RNTI has been allocated for the terminal device in the connected state. When Msg2 carries the C-RNTI (for example, a C-RNTI in a physical downlink control channel (Physical Downlink Control Channel, PDCCH)), the terminal device considers that contention resolution succeeds when determining that Msg2 carries the C-RNTI.

It should be noted that the contention resolution identity is usually unique. In this embodiment of the present disclosure, the contention resolution identity is associated with at least some configuration information in the target configuration information, thereby further reducing the probability of collision amongst terminal devices.

It should be noted that the foregoing association manners may be combined at random according to an actual requirement. This is not limited in this embodiment of the present disclosure.

Optionally, the transmitting, to the terminal device, a response message that includes target configuration information is specifically:

transmitting, to the terminal device in a HARQ manner, Msg2 that includes the target configuration information.

In this embodiment of the present disclosure, the terminal device may share one of HARQ processes of another downlink data transmitting to transmit Msg2, or may use a HARQ process independent of a HARQ process of another downlink data transmitting to transmit Msg2.

Optionally, if the HARQ process independent of the HARQ process of another downlink data transmitting is used to transmit Msg2, no HARQ process identifier may be required. If the shared HARQ process is used to transmit Msg2, a HARQ process identifier (HARQ Process ID) predefined in a protocol may be used, namely, a HARQ process ID 0, or downlink control information (Downlink Control Information, DCI) in the PDCCH indicates the HARQ process identifier.

In this embodiment of the present disclosure, Msg2 that includes the target configuration information is sent to the terminal device in the HARQ manner, so that a success rate of transmitting Msg2 can be improved.

Optionally, after the transmitting, to the terminal device, a response message that includes target configuration information, the method further includes:

receiving a feedback message that is of Msg2 and that is transmitted by the terminal device.

In this embodiment of the present disclosure, the feedback message of Msg2 may be a feedback message transmitted by the terminal device after the terminal device receives Msg2.

Optionally, the feedback message may include at least one of a feedback message from control channel and a feedback message from data channel.

In this embodiment of the present disclosure, if the network side device is configured to perform feedback by using a control channel, the terminal device feeds back the feedback message from control channel, for example, HARQ response information (HARQ ACK information); and if the network side device is configured to perform feedback by using a data channel, the terminal device feeds back data channel feedback information, for example, control information carried in the PUSCH. Optionally, a feedback message of the terminal device may be predefined in the protocol.

Optionally, the feedback message from data channel may include at least one of a terminal device identity and a cell radio network temporary identifier C-RNTI of a physical uplink shared channel PUSCH.

In this embodiment of the present disclosure, the terminal identity of the PUSCH may be C-RNTI scrambling code in the PUSCH.

It should be noted that if the C-RNTI is sent in a MAC CE or an RRC message, the data channel feedback information may include the C-RNTI.

Optionally, if the terminal device performs feedback by using a data channel (for example, the PUSCH), data of the data channel may be transmitted by using a HARQ process. HARQ configuration information may be configured by a network side (for example, indicated by DCI or configured by using RRC) or predefined in the protocol.

Specifically, the HARQ configuration information may include at least one of a HARQ process identifier and a HARQ redundancy version identifier.

The HARQ process identifier is used to uniquely identify the HARQ process. Specifically, the HARQ process identifier may be a HARQ process identifier independent of another uplink data transmitting, or may be a HARQ process identifier shared with another uplink data transmitting. In this case, the HARQ process identifier may be indicated by using an uplink grant (UL Grant) in Msg2.

The HARQ redundancy version identifier may be a redundancy version identifier predefined in the protocol, for example, RV0, or may be a HARQ redundancy version identifier indicated by the network side device by using the uplink grant (UL Grant) in Msg2.

Optionally, the method further includes:
retransmitting Msg2 to the terminal device if the feedback message that is of Msg2 and that is transmitted by the terminal device is not received or the feedback message indicates retransmission.

In an implementation, when the feedback message that is of Msg2 and that is transmitted by the terminal device is not received, Msg2 may be retransmitted to the terminal device within a time duration (for example, time window for the reception of random access response) in which the terminal device receives Msg2.

In another implementation, when the feedback message that is of Msg2 and that is transmitted by the terminal device indicates retransmission, Msg2 may be retransmitted to the terminal device. For example, when the terminal device fails to decode data in Msg2, the terminal device may transmit a feedback message to instruct the network side device to retransmit Msg2.

In this embodiment of the present disclosure, Msg2 is retransmitted to the terminal device if the feedback message that is of Msg2 and that is transmitted by the terminal device is not received or the feedback message indicates retransmission, so that a success rate of transmitting Msg2 can be improved.

Optionally, after the receiving a feedback message that is of Msg2 and that is transmitted by the terminal device, the method further includes:
transmitting indication information to the terminal device, where the indication information is used to indicate whether the terminal device retransmits the feedback message.

In this embodiment of the present disclosure, after receiving the feedback message that is of Msg2 and that is transmitted by the terminal device, the network side device may transmit the indication information to the terminal device, to indicate whether the terminal device retransmits the feedback message.

For example, if the terminal device performs feedback (in other words, transmits a feedback message) by using a data channel (for example, the PUSCH), the network side device may transmit indication information to the terminal device, to indicate whether data sent on the data channel needs to be retransmitted, where the indication information may include the terminal device identity (for example, the C-RNTI). For example, a PDCCH identified by using the C-RNTI indicates whether the data sent on the data channel needs to be retransmitted (for example, the PDCCH instructs to retransmit a HARQ process).

In this embodiment of the present disclosure, the indication information is sent to the terminal device, to indicate whether the terminal device retransmits the feedback message, so that a success rate of transmitting the feedback message can be improved, and system resources can be saved.

A random access method provided in an embodiment of the present disclosure is described below with reference to an example.

Figure 5:
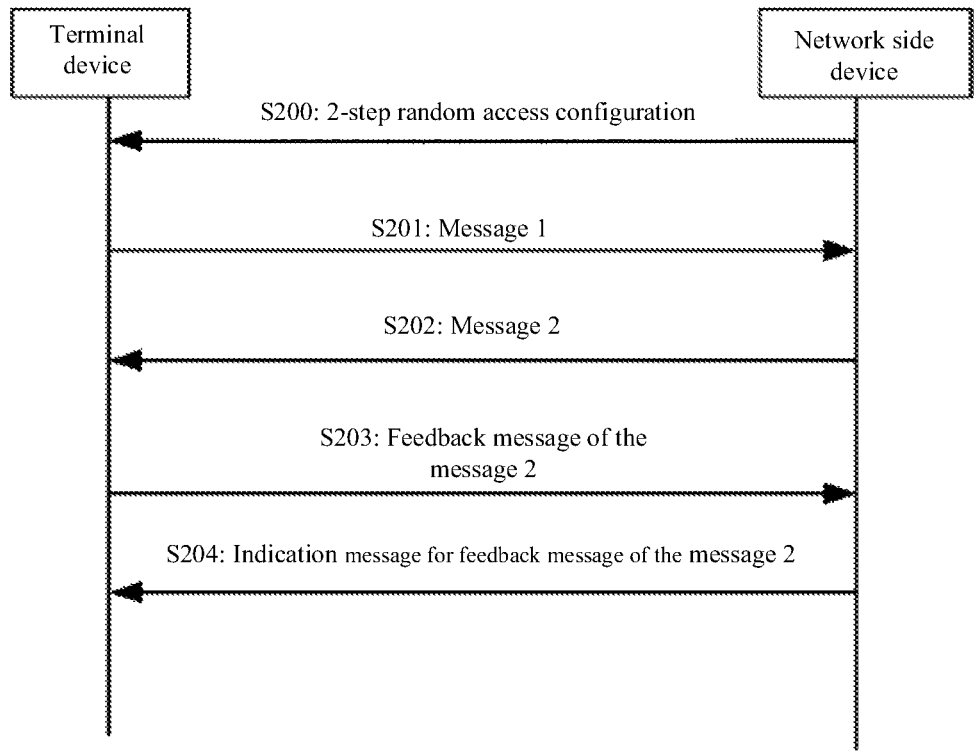
FIG. 5 is a flowchart of another random access method according to an embodiment of the present disclosure.

As shown in FIG. 5, a random access method provided in an embodiment of the present disclosure may include the following steps:

Step S200: A network side device configures configuration information of 2-step random access for a terminal device.

The configuration information may include transmitting resource information of Msg1 and receiving resource information of Msg2. Optionally, the configuration information may further include resource configuration information of Msg2 feedback information.

Step S201: The terminal device transmits Msg1 to the network side device.

In this step, after triggering a two-step random access (2-Step RACH) process, the terminal device may transmit, to the network side device, only Msg1 that includes a data part, or may transmit, to the network side device, Msg1 that includes a data part and a control part.

Step S202: The network side device transmits Msg2 to the terminal device.

In this step, Msg2 may include at least one of the following: a random access preamble identifier, a timing advance, uplink resource allocation information used to indicate a transmission resource for a feedback message of Msg2, a terminal device identity, a contention resolution identity, and wireless connection configuration information.

Step S203: The terminal device transmits a Msg2 feedback message to the network side device.

In this step, the Msg2 feedback message is a feedback message of Msg2.

In an implementation, when determining that the contention resolution succeeds, the terminal device may transmit the feedback message of Msg2 to the network side device, to notify the network side device that the contention resolution succeeds.

In another implementation, when successfully receiving Msg2, the terminal device may transmit the feedback message of Msg2 to the network side device, to notify the network side device that the terminal device has successfully received Msg2. For example, when data of Msg2 is successfully decoded, the terminal device may perform feedback to the network side device, to instruct the network side device to stop retransmitting Msg2, thereby saving system resources.

Step S204: The network side device transmits an indication message for feedback message of the Msg2 to the terminal device.

In this embodiment of the present disclosure, after receiving the feedback message that is of Msg2 and that is transmitted by the terminal device, the network side device may transmit the indication information to the terminal device, to indicate whether the terminal device retransmits the feedback message.

For example, if the terminal device performs feedback (in other words, transmits a feedback message) by using a data channel (for example, a PUSCH), the network side device may transmit indication information to the terminal device, to indicate whether data sent on the data channel needs to be retransmitted, where the indication information may include a terminal device identity (for example, a C-RNTI).

According to the random access method provided in this embodiment of the present disclosure, in a two-step random access (namely, 2-Step RACH) process, the terminal device may feed back, to the network side device, whether Msg2 is successfully received, so that the terminal device and the network side device can keep consistent understanding of whether Msg2 is successfully received, and assist a network side to perform subsequent scheduling of data receiving and transmitting.

Figure 6:
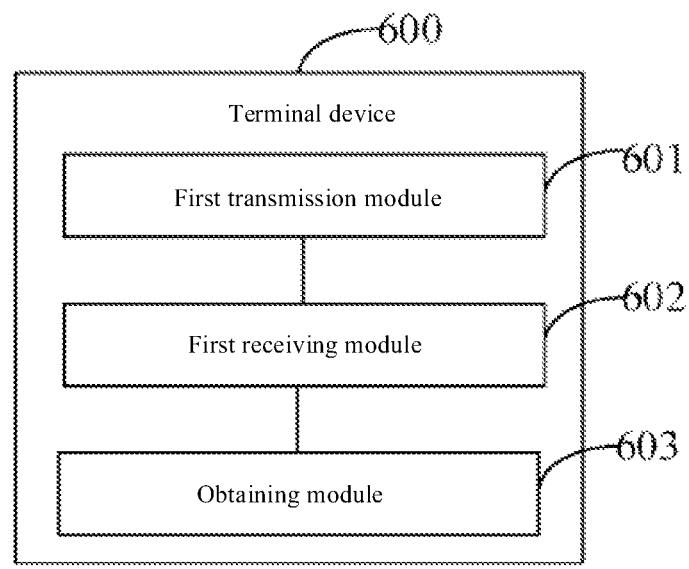
FIG. 6 is a structural diagram of a terminal device according to an embodiment of the present disclosure.

FIG. 6 is a structural diagram of a terminal device according to an embodiment of the present disclosure. As shown in FIG. 6, a terminal device 600 includes a first transmission module 601, a first receiving module 602, and an obtaining module 603.

The first transmission module 601 is configured to transmit a first message to a network side device.

The first receiving module 602 is configured to receive a response message that is transmitted by the network side device and that includes target configuration information, where there is an association relationship between at least some configuration information in the target configuration information and an association parameter, and the association parameter is a parameter that can be obtained by the terminal device before the terminal device receives the response message.

The obtaining module 603 is configured to obtain, based on the association relationship, configuration information that is associated with a target association parameter of the terminal device from the target configuration information.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

Optionally, the association parameter includes at least one of a random access preamble identifier and a contention resolution identity.

Optionally, the uplink resource allocation information includes at least one of the following:
uplink resource allocation information of a data channel; and
uplink resource allocation information of a control channel.

Optionally, the terminal device further includes:
a second transmission module, configured to: after Msg2 that is transmitted by the network side device and that includes the target configuration information is received, transmit a feedback message of Msg2 to the network side device.

Optionally, the feedback message includes at least one of a feedback message from control channel and a feedback message from data channel.

Optionally, the feedback message from data channel includes at least one of a terminal device identity and a cell radio network temporary identifier C-RNTI of a physical uplink shared channel PUSCH.

Optionally, the second transmission module is specifically configured to:
when the terminal device considers that contention resolution is successful, transmit the feedback message of Msg2 to the network side device; or
when successfully receiving the Msg2, transmit the feedback message of Msg2 to the network side device.

Optionally, the second transmission module is specifically configured to:
transmit the feedback message of Msg2 to the network side device in a HARQ manner.

Optionally, the terminal device further includes:
a third transmission module, configured to: after the feedback message of Msg2 is sent to the network side device, retransmit the feedback message of Msg2 to the network side device if first indication information transmitted by the network side device is received, where the first indication information is used to instruct to retransmit the feedback message.

Optionally, the terminal device further includes:
a first starting module, configured to: when the feedback message is a feedback message from data channel, start a timer at the moment when the feedback message is transmitted to the network side device;
a first stopping module, configured to: if the timer is running, stop the timer if second indication information transmitted by the network side device is received, where the second indication information is used to indicate that the retransmitting the feedback message is not needed; and
a fourth transmission module, configured to retransmit the feedback message to the network side device if the timer expires.

Optionally, the terminal device further includes:
a second starting module, configured to: when the feedback message is a feedback message from data channel, start a timer at the moment when the feedback message is transmitted to the network side device;
a restarting module, configured to: if the timer is running, restart the timer and retransmit the feedback message to the network side device if first indication information transmitted by the network side device is received, where the first indication information is used to instruct to retransmit the feedback message; and
a second stopping module, configured to stop retransmitting the feedback message to the network side device if the timer expires.

The terminal device 600 provided in this embodiment of the present disclosure can implement processes implemented by the terminal device in the method embodiments of FIG. 3 and FIG. 5. To avoid repetition, details are not described herein again.

According to the terminal device 600 in this embodiment of the present disclosure, the first transmission module 601 is configured to transmit the first message to the network side device; the first receiving module 602 is configured to receive the response message that is transmitted by the network side device and that includes the target configuration information, where there is an association relationship between at least some configuration information in the target configuration information and an association parameter, and the association parameter is a parameter that can be obtained by the terminal device before the terminal device receives the response message; and the obtaining module 603 is configured to obtain, based on the association relationship, the configuration information that is associated with the target association parameter of the terminal device from the target configuration information, so that the probability of collision amongst multiple terminal devices in the random access process can be reduced.

Figure 7:
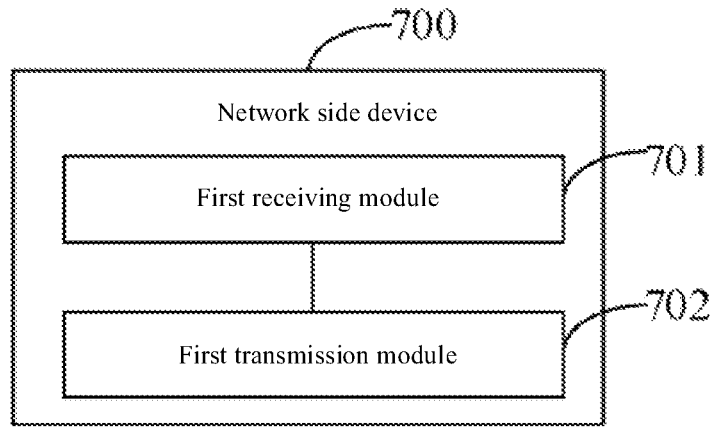
FIG. 7 is a structural diagram of a network side device according to an embodiment of the present disclosure.

FIG. 7 is a structural diagram of a network side device according to an embodiment of the present disclosure. As shown in FIG. 7, a network side device 700 includes a first receiving module 701 and a first transmission module 702.

The first receiving module 701 is configured to receive a first message transmitted by a terminal device.

The first transmission module 702 is configured to transmit, to the terminal device, a response message that includes target configuration information.

There is an association relationship between at least some configuration information in the target configuration information and an association parameter, and the association parameter is a parameter that can be obtained by the terminal device before the terminal device receives the response message.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

Optionally, the association parameter includes at least one of a random access preamble identifier and a contention resolution identity.

Optionally, the uplink resource allocation information includes at least one of the following:

uplink resource allocation information of a data channel; and uplink resource allocation information of a control channel.

Optionally, the first transmission module is specifically configured to:

transmit, to the terminal device in a HARQ manner, Msg2 that includes the target configuration information.

Optionally, the network side device further includes:

a second receiving module, configured to: after the response message that includes the target configuration information is sent to the terminal device, receive a feedback message that is of Msg2 and that is transmitted by the terminal device.

Optionally, the network side device further includes:

a second transmission module, configured to: retransmit Msg2 to the terminal device if the feedback message that is of Msg2 and that is transmitted by the terminal device is not received or the feedback message indicates retransmission.

Optionally, the feedback message includes at least one of a feedback message from control channel and a feedback message from data channel.

Optionally, the feedback message from data channel includes at least one of a terminal device identity and a cell radio network temporary identifier C-RNTI of a physical uplink shared channel PUSCH.

Optionally, the network side device further includes:

a third transmission module, configured to: after the feedback message that is of Msg2 and that is transmitted by the terminal device is received, transmit indication information to the terminal device, where the indication information is used to indicate whether the terminal device retransmits the feedback message.

The network side device 700 provided in this embodiment of the present disclosure can implement processes implemented by the network side device in the method embodiments of FIG. 4 and FIG. 5. To avoid repetition, details are not described herein again.

According to the network side device 700 in this embodiment of the present disclosure, the first receiving module 701 is configured to receive the first message transmitted by the terminal device, and the first transmission module 702 is configured to transmit, to the terminal device, the response message that includes the target configuration information, where there is an association relationship between at least some configuration information in the target configuration information and an association parameter, and the association parameter is a parameter that can be obtained by the terminal device before the terminal device receives the response message. Therefore, each terminal device may obtain, based on the association parameter, configuration information corresponding to the terminal device, to reduce the probability of collision amongst multiple terminal devices in the random access process.

Figure 8:
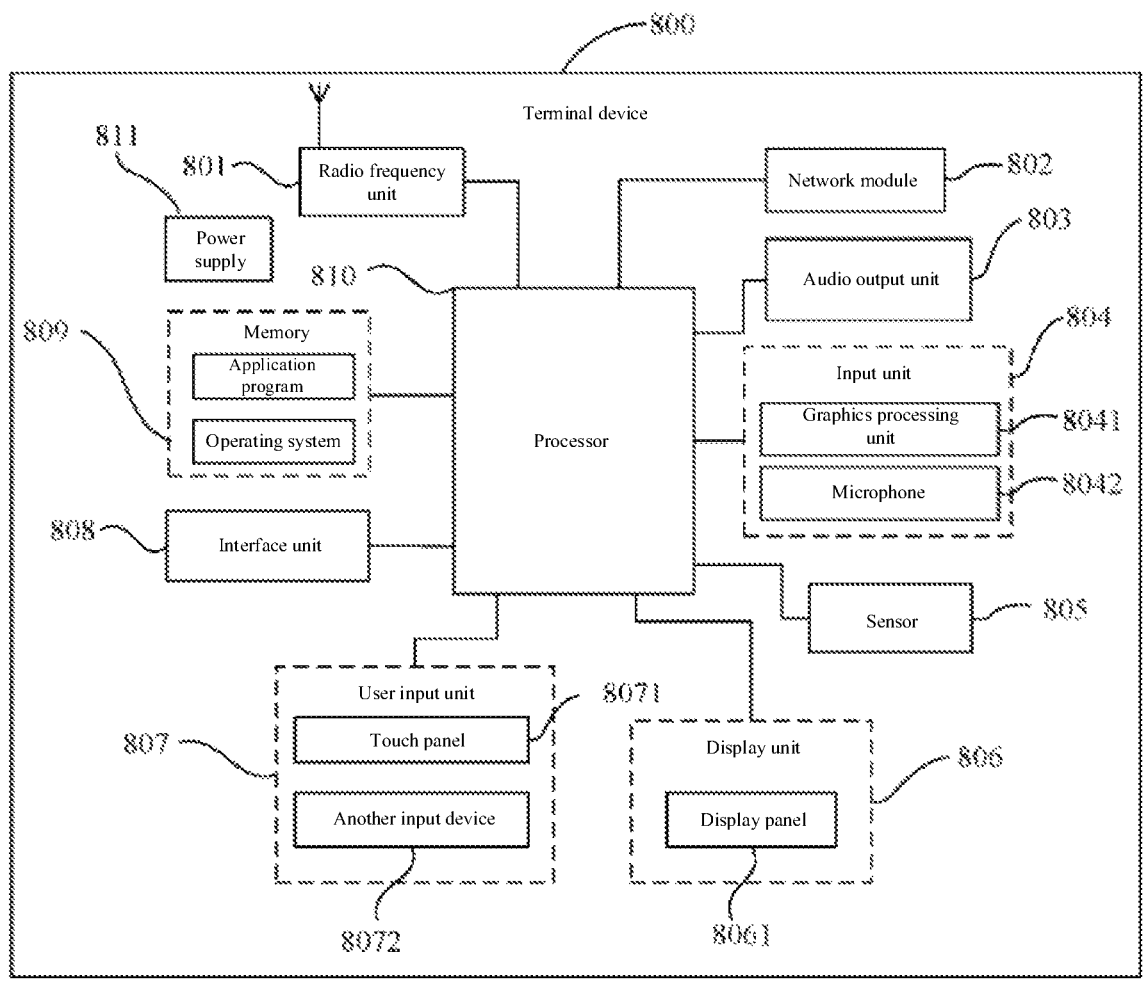
FIG. 8 is a structural diagram of another terminal device according to an embodiment of the present disclosure.

FIG. 8 is a structural diagram of another terminal device according to an embodiment of the present disclosure. As shown in FIG. 8, a terminal device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The radio frequency unit 801 is configured to transmit a first message to a network side device, and receive a response message that is transmitted by the network side device and that includes target configuration information, where there is an association relationship between at least some configuration information in the target configuration information and an association parameter, and the association parameter is a parameter that can be obtained by the terminal device before the terminal device receives the response message.

The processor 810 is configured to obtain, based on the association relationship, configuration information that is associated with a target association parameter of the terminal device from the target configuration information.

In this embodiment of the present disclosure, each terminal device may obtain, based on the association parameter, configuration information corresponding to the terminal device, to reduce the probability of collision amongst multiple terminal devices in a random access process.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

Optionally, the association parameter includes at least one of a random access preamble identifier and a contention resolution identity.

Optionally, the uplink resource allocation information includes at least one of the following:

uplink resource allocation information of a data channel; and uplink resource allocation information of a control channel.

Optionally, the processor 810 is further configured to:

after Msg2 that is transmitted by the network side device and that includes the target configuration information is received, transmit a feedback message of Msg2 to the network side device.

Optionally, the feedback message includes at least one of a feedback message from control channel and a feedback message from data channel.

Optionally, the feedback message from data channel includes at least one of a terminal device identity and a cell radio network temporary identifier C-RNTI of a physical uplink shared channel PUSCH.

Optionally, the processor 810 is further configured to:

when the terminal device considers that contention resolution is successful, transmit the feedback message of Msg2 to the network side device; or when successfully receiving the Msg2, transmit the feedback message of Msg2 to the network side device.

Optionally, the processor 810 is further configured to:

transmit the feedback message of Msg2 to the network side device in a HARQ manner.

Optionally, the processor 810 is further configured to:

after the feedback message of Msg2 is sent to the network side device, retransmit the feedback message of Msg2 to the network side device if first indication information transmitted by the network side device is received, where the first indication information is used to instruct to retransmit the feedback message.

Optionally, the processor 810 is further configured to:

when the feedback message is a feedback message from data channel, start a timer at the moment when the feedback message is transmitted to the network side device;

if the timer is running, stop the timer if second indication information transmitted by the network side device is received, where the second indication information is used to indicate that the retransmitting the feedback message is not needed; and retransmit the feedback message to the network side device if the timer expires.

Optionally, the processor 810 is further configured to:

when the feedback message is a feedback message from data channel, start a timer at the moment when the feedback message is transmitted to the network side device;

if the timer is running, restart the timer and retransmitting the feedback message to the network side device if first indication information transmitted by the network side device is received, where the first indication information is used to instruct to retransmit the feedback message; and stop retransmitting the feedback message to the network side device if the timer expires.

It should be understood that, in this embodiment of the present disclosure, the radio frequency unit 801 may be configured to receive and transmit information or receive and transmit a signal in a call process. Specifically, after downlink data from a base station is received, the processor 810 processes the downlink data. In addition, uplink data is sent to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through wireless communication.

The terminal device provides a user with wireless broadband Internet access through the network module 802, for example, helps the user transmit and receive emails, browse web pages, and access streaming media.

The audio output unit 803 can convert audio data received by the radio frequency unit 801 or the network module 802 or stored in the memory 809 into an audio signal, and output the audio signal as sound. In addition, the audio output unit 803 may further provide audio output (for example, call signal receiving sound or message receiving sound) related to a specific function performed by the terminal device 800. The audio output unit 803 includes a loudspeaker, a buzzer, a telephone receiver, and the like.

The input unit 804 is configured to receive an audio or video signal. The input unit 804 may include a graphics processing unit (Graphics Processing Unit, GPU) 8041 and a microphone 8042. The graphics processing unit 8041 is configured to process image data of a static picture or a video obtained by an image capture apparatus (for example, a camera) in video capture mode or image capture mode. A processed image frame can be displayed on the display unit 806. The image frame processed by the graphics processing unit 8041 can be stored in the memory 809 (or another storage medium) or sent via the radio frequency unit 801 or the network module 802. The microphone 8042 may receive sound and can process such sound into audio data. The processed audio data can be converted, in a telephone call mode, into a format that can be transmitted by the radio frequency unit 801 to a mobile communications base station for output.

The terminal device 800 further includes at least one sensor 805, for example, an optical sensor, a motion sensor, and other sensors. Specifically, the optical sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, and an infrared sensor. Details are not described herein.

The display unit 806 is configured to display information input by a user or information provided to a user. The display unit 806 may include the display panel 8061, and the display panel 8061 may be configured in a form of a liquid crystal display (Liquid Crystal Display, LCD), an organic light-emitting diode (Organic Light-Emitting Diode, OLED), or the like.

The user input unit 807 may be configured to receive entered digit or character information and generate a key signal input related to user setting and function control of the terminal device. Specifically, the user input unit 807 includes a touch panel 8071 and another input device 8072. The touch panel 8071, also referred to as a touchscreen, may collect a touch operation performed by the user on or near the touch panel 8071 (for example, an operation performed by the user on or near the touch panel 8071 by using any suitable object or accessory such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 810, and can receive and execute a command transmitted by the processor 810. In addition, the touch panel 8071 may be implemented by using multiple types such as a resistive type, a capacitive type, an infrared ray, and a surface acoustic wave. In addition to the touch panel 8071, the user input unit 807 may further include the another input device 8072. Specifically, the another input device 8072 may include but is not limited to one or more of a physical keyboard, a function key (such as a volume control key or an on/off key), a trackball, a mouse, a joystick, and the like. Details are not described herein.

Further, the touch panel 8071 may cover the display panel 8061. After detecting the touch operation on or near the touch panel 8071, the touch panel 8061 transmits the touch operation to the processor 810 to determine a type of a touch event, and then the processor 810 provides corresponding visual output on the display panel 8061 based on the type of the touch event. Although in FIG. 8, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus may include a wired or wireless headphone port, an external power supply (or a battery charger) port, a wired or wireless data port, a storage card port, a port for connecting an apparatus having an identification module, an audio input/output (I/O) port, a video I/O port, a headphone port, or the like. The interface unit 808 may be configured to receive input (for example, data information and power) from the external apparatus and transmit the received input to one or more elements in the terminal device 800, or may be configured to transmit data between the terminal device 800 and the external apparatus.

The memory 809 may be configured to store a software program and various data. The memory 809 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 809 may include a high-speed random access memory, and may further include a non-volatile memory, such as at least one magnetic disk storage device, a flash memory device, or another volatile solid-state storage device.

The processor 810 is a control center of the terminal device, and is connected to all parts of the entire terminal device by using various interfaces and lines, and performs various functions of the terminal device and processes data by running or executing the software program and/or the module that are stored in the memory 809 and invoking the data stored in the memory 809, to implement overall monitoring on the terminal device. The processor 810 may include one or more processing units. Optionally, the processor 810 may be integrated with an application processor and a modem processor. The application processor mainly processes an operating system, a user interface, an application program, and the like, and the modem processor mainly processes wireless communication. It can be understood that alternatively, the modem processor may not be integrated into the processor 810.

The terminal device 800 may further include the power supply 811 (such as a battery) that supplies power to each component. Optionally, the power supply 811 may be logically connected to the processor 810 by using a power management system, to implement functions such as charging, discharging, and power consumption management by using the power management system.

In addition, the terminal device 800 includes some functional modules that are not shown. Details are not described herein.

Optionally, an embodiment of the present disclosure further provides a terminal device, including a processor 810, a memory 809, and a computer program that is stored in the memory 809 and that can run on the processor 810. When the computer program is executed by the processor 810, each process of the embodiment of the foregoing random access method can be implemented, and a same technical effect can be achieved. To avoid repetition, details are not described herein again.

An embodiment of the present disclosure further provides a computer-readable storage medium. A computer program is stored in the computer-readable storage medium. When being executed by a processor, the computer program implements each process of the embodiment of the foregoing random access method, and a same technical effect can be achieved. To avoid repetition, details are not described herein.

The computer-readable storage medium is a read-only memory (Read-Only Memory, ROM), a random access memory (Random Access Memory, RAM), a magnetic disk, an optical disc, or the like.

Figure 9:
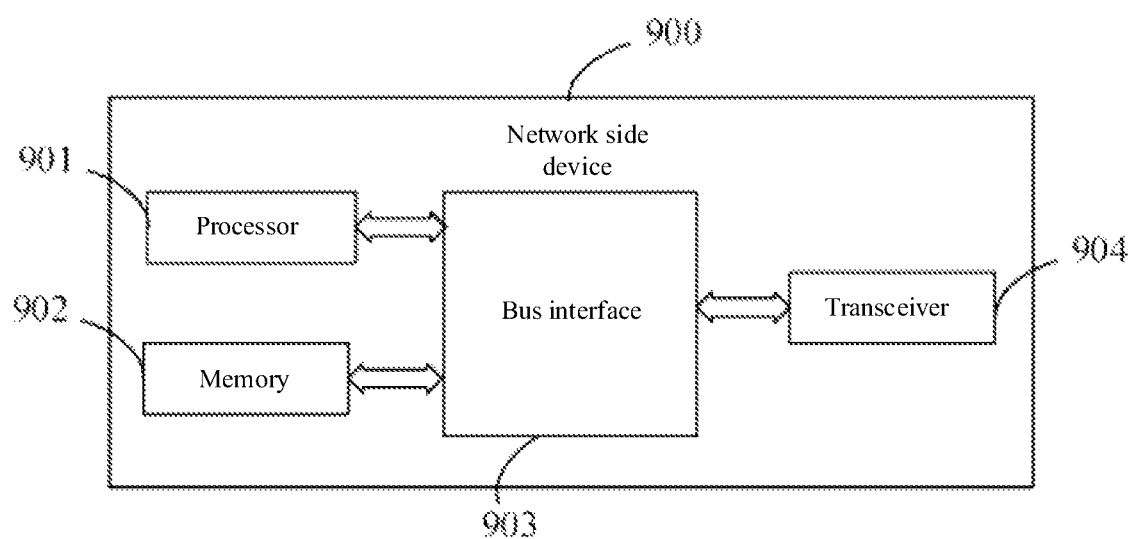
FIG. 9 is a structural diagram of another network side device according to an embodiment of the present disclosure.

FIG. 9 is a structural diagram of another network side device according to an embodiment of the present disclosure. The network side device may be a source node or a target node. As shown in FIG. 9, a network side device 900 includes a processor 901, a memory 902, a bus interface 903, and a transceiver 904, where the processor 901, the memory 902, and the transceiver 904 are all connected to the bus interface 903.

In this embodiment of the present disclosure, the network side device 900 further includes a computer program that is stored in the memory 902 and that can run on the processor 901. When the computer program is executed by the processor 901, the following steps are implemented:

receiving a first message transmitted by a terminal device; and transmitting, to the terminal device, a response message that includes target configuration information; where there is an association relationship between at least some configuration information in the target configuration information and an association parameter, and the association parameter is a parameter that can be obtained by the terminal device before the terminal device receives the response message.

Optionally, the first message is Msg1 in the 2-step random access procedure, and the response message is Msg2 in the 2-step random access procedure.

Optionally, the target configuration information includes at least one of the following: a random access preamble identifier, a timing advance, uplink resource allocation information used to indicate a transmission resource for a feedback message of Msg2, a terminal device identity, a contention resolution identity, and wireless connection configuration information.

Optionally, the association parameter includes at least one of a random access preamble identifier and a contention resolution identity.

Optionally, the uplink resource allocation information includes at least one of the following:

uplink resource allocation information of a data channel; and uplink resource allocation information of a control channel.

Optionally, when being executed by the processor 901, the computer program is further configured to:

transmit, to the terminal device in a HARQ manner, Msg2 that includes the target configuration information.

Optionally, after the transmitting, to the terminal device, a response message that includes target configuration information, the method further includes:

receiving a feedback message that is of Msg2 and that is transmitted by the terminal device.

Optionally, when being executed by the processor 901, the computer program is further configured to:

retransmit Msg2 to the terminal device if the feedback message that is of Msg2 and that is transmitted by the terminal device is not received or the feedback message indicates retransmission.

Optionally, the feedback message includes at least one of a feedback message from control channel and a feedback message from data channel.

Optionally, the feedback message from data channel includes at least one of a terminal device identity and a cell radio network temporary identifier C-RNTI of a physical uplink shared channel PUSCH.

Optionally, when being executed by the processor 901, the computer program is further configured to:

after the feedback message that is of Msg2 and that is transmitted by the terminal device is received, transmit indication information to the terminal device, where the indication information is used to indicate whether the terminal device retransmits the feedback message.

In this embodiment of the present disclosure, each terminal device may obtain, based on the association parameter, configuration information corresponding to the terminal device, to reduce the probability of collision amongst multiple terminal devices in a random access process.

Optionally, an embodiment of the present disclosure further provides a network side device, including a processor 901, a memory 902, and a computer program that is stored in the memory 902 and that can run on the processor 901.

When the computer program is executed by the processor 901, each process of the embodiment of the foregoing random access method can be implemented, and a same technical effect can be achieved. To avoid repetition, details are not described herein again.

An embodiment of the present disclosure further provides a computer-readable storage medium. A computer program is stored in the computer-readable storage medium. When being executed by a processor, the computer program implements each process of the embodiment of the foregoing random access method, and a same technical effect can be achieved. To avoid repetition, details are not described herein. The computer-readable storage medium is a read-only memory (Read-Only Memory, ROM), a random access memory (Random Access Memory, RAM), a magnetic disk, an optical disc, or the like.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a readable storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely an example, but are not limiting. A person of ordinary skill in the art may make many forms without departing from the objective and the scope of the claims of the present disclosure.

The invention claimed is:

1. A random access method, applied to a terminal device and comprising:

transmitting a first message to a network side device;

receiving a response message that is transmitted by the network side device and that comprises target configuration information, wherein, there is an association relationship between at least some configuration information in the target configuration information and an association parameter, and the association parameter is a parameter that can be obtained by the terminal device before the terminal device receives the response message; and obtaining, based on the association relationship, configuration information that is associated with a target association parameter of the terminal device from the target configuration information;

wherein the first message is an Msg1 in a 2-step random access procedure, and the response message is an Msg2 in the 2-step random access procedure;

the target configuration information comprises uplink resource allocation information used to indicate a transmission resource for a feedback message of the Msg2;

wherein after receiving the response message that is transmitted by the network side device and that comprises target configuration information, the method further comprises:

when successfully receiving the Msg2, the terminal device transmits the feedback message of the Msg2 to the network side device;

wherein the feedback message comprises a Hybrid Automatic Repeat Request acknowledgment (HARQ ACK).

2. The method according to claim 1, wherein
the target configuration information further comprises at least one of the following: a random access preamble identifier, a timing advance, a terminal device identity, a contention resolution identity, or wireless connection configuration information.

3. The method according to claim 2, wherein when the target configuration information comprises the random access preamble identifier, the terminal device determines that a random access preamble identifier comprised in Msg2 is the identifier of the random access preamble transmitted by the terminal device in Msg1, and behavior of the terminal device comprises at least one of the following:

using a contention resolution identity associated with the random access preamble identifier for contention resolution; or using the uplink resource allocation information associated with the random access preamble identifier to transmit the feedback message of Msg2; or using the terminal device identity associated with the random access preamble identifier as an identifier of the terminal device; or using the wireless connection configuration information associated with the random access preamble identifier as wireless connection configuration information of the terminal device.

4. The method according to claim 2, wherein after the terminal device considers that a contention resolution is successful based on the contention resolution identity, a behavior of the terminal device comprises at least one of the following:

using the uplink resource allocation information associated with the contention resolution identity to transmit the feedback message of Msg2; or using the terminal device identity associated with the contention resolution identity as an identifier of UE in a connected state; or using the wireless connection configuration information associated with the contention resolution identity as wireless connection configuration information of the terminal device.

5. The method according to claim 2, wherein the association parameter comprises at least one of a random access preamble identifier or a contention resolution identity.

6. The method according to claim 2, wherein the uplink resource allocation information comprises at least one of the following:
uplink resource allocation information of a data channel; or
uplink resource allocation information of a control channel.

7. The method according to claim 1 wherein after transmitting the feedback message of Msg2 to the network side device, the method further comprises:
when receiving first indication information transmitted by the network side device, the terminal device retransmits the feedback message of Msg2 to the network side device, wherein the first indication information is used to instruct the terminal device to retransmit the feedback message of Msg2.

8. A random access method, applied to a network side device and comprising:
receiving a first message transmitted by a terminal device; and
transmitting, to the terminal device, a response message that comprises target configuration information; wherein
there is an association relationship between at least some configuration information in the target configuration information and an association parameter, and the association parameter is a parameter that can be obtained by the terminal device before the terminal device receives the response message;
wherein the first message is an Msg1 in a 2-step random access procedure, and the response message is an Msg2 in the 2-step random access procedure;
the target configuration information comprises uplink resource allocation information used to indicate a transmission resource for a feedback message of the Msg2;
wherein after the transmitting, to the terminal device, the response message that comprises target configuration information, the method further comprises:
receiving the feedback message for the Msg2 and that is transmitted by the terminal device after the terminal device successfully receives the Msg2;
wherein the feedback message comprises a Hybrid Automatic Repeat Request acknowledgment (HARQ ACK).

9. The method according to claim 8, wherein
the target configuration information further comprises at least one of the following: a random access preamble identifier, a timing advance, a terminal device identity, a contention resolution identity, or wireless connection configuration information.

10. The method according to claim 9, wherein the association parameter comprises at least one of a random access preamble identifier and a contention resolution identity.

11. The method according to claim 9, wherein the uplink resource allocation information comprises at least one of the following:
uplink resource allocation information of a data channel; or
uplink resource allocation information of a control channel.

12. The method according to claim 8, wherein the method further comprises:
retransmitting the Msg2 to the terminal device if the feedback message or the Msg2 and that is transmitted by the terminal device is not received or the feedback message indicates retransmission.

13. A terminal device, comprising: a memory, a processor, and a computer program that is stored in the memory and that can run on the processor, wherein the processor executes the computer program to:
- transmit a first message to a network side device;
- receive a response message that is transmitted by the network side device and that comprises target configuration information, wherein, there is an association relationship between at least some configuration information in the target configuration information and an association parameter, and the association parameter is a parameter that can be obtained by the terminal device before the terminal device receives the response message; and
- obtain, based on the association relationship, configuration information that is associated with a target association parameter of the terminal device from the target configuration information;
- wherein the first message is an Msg1 in a 2-step random access procedure, and the response message is an Msg2 in the 2-step random access procedure;
- the target configuration information comprises uplink resource allocation information used to indicate a transmission resource for a feedback message of the Msg2;
- wherein the processor executes the computer program to:
- after the Msg2 that is transmitted by the network side device and that comprises the target configuration information is received successfully by the terminal device, transmit the feedback message of Msg2 to the network side device;
- wherein the feedback message comprises a Hybrid Automatic Repeat Request acknowledgment (HARQ ACK).

14. The terminal device according to claim 13, wherein the target configuration information further comprises at least one of the following: a random access preamble identifier, a timing advance, a terminal device identity, a contention resolution identity, or wireless connection configuration information.

15. The terminal device according to claim 14, wherein when the target configuration information comprises the random access preamble identifier, the terminal device determines that a random access preamble identifier comprised in Msg2 is a random access preamble identifier transmitted by the terminal device in Msg1, and a behavior of the terminal device comprises at least one of the following:
- using a contention resolution identity associated with the random access preamble identifier for contention resolution; or
- using the uplink resource allocation information associated with the random access preamble identifier to transmit the feedback message of Msg2; or
- using the terminal device identity associated with the random access preamble identifier as an identifier of the terminal device; or
- using wireless connection configuration information associated with the random access preamble identifier as wireless connection configuration information of the terminal device.

16. The terminal device according to claim 14, wherein after the terminal device considers that a contention resolution is successful based on the contention resolution identity, a behavior of the terminal device comprises at least one of the following:
- using the uplink resource allocation information associated with the contention resolution identity to transmit the feedback message of Msg2; or
- using the terminal device identity associated with the contention resolution identity as an identifier of the terminal device in a connected state; or
- using wireless connection configuration information associated with the contention resolution identity as wireless connection configuration information of the terminal device.

* * * * *